(12) United States Patent
Kim et al.

(10) Patent No.: US 11,401,021 B2
(45) Date of Patent: Aug. 2, 2022

(54) COVER FOR PROTECTING RAWINSONDE BALLOON IN PREPARING FLIGHT OF RAWINSONDE BALLOON

(71) Applicant: National Institute of Meteorological Sciences, Seogwipo-si (KR)

(72) Inventors: Geon Tae Kim, Gangneung-si (KR); Seon Jeong Kim, Gangneung-si (KR); Sang Don Lee, Seosan-si (KR); Seung Hyeop Lee, Gangneung-si (KR)

(73) Assignee: National Institute of Meteorological Sciences, Seogwipo-si (KR)

( * ) Notice: Subject to any disclaimer, the term of this patent is extended or adjusted under 35 U.S.C. 154(b) by 0 days.

(21) Appl. No.: 17/542,038

(22) Filed: Dec. 3, 2021

(65) Prior Publication Data

US 2022/0177107 A1     Jun. 9, 2022

(30) Foreign Application Priority Data

Dec. 7, 2020   (KR) .......................... 10-2020-0169953

(51) Int. Cl.
*B64B 1/58*     (2006.01)
*B64B 1/40*     (2006.01)
*G01W 1/08*     (2006.01)

(52) U.S. Cl.
CPC .................. *B64B 1/58* (2013.01); *B64B 1/40* (2013.01); *G01W 1/08* (2013.01)

(58) Field of Classification Search
CPC ... B64B 1/002; B64B 1/58; B64F 1/04; B64F 1/14; A63H 2027/1033
See application file for complete search history.

(56) References Cited

U.S. PATENT DOCUMENTS

| 2,635,834 | A | * | 4/1953 | Huch | ........................ | B64B 1/40 |
| | | | | | | 244/31 |
| 3,195,835 | A | * | 7/1965 | Eyre | ........................ | B64B 1/62 |
| | | | | | | 244/31 |
| 3,298,634 | A | * | 1/1967 | Kantor | ...................... | B64B 1/58 |
| | | | | | | 244/31 |
| 5,240,449 | A | | 8/1993 | Sloan | | |
| 5,638,581 | A | | 6/1997 | Burke | | |
| 7,275,496 | B2 | * | 10/2007 | French | .................... | G01W 1/08 |
| | | | | | | 244/31 |
| 9,745,040 | B1 | | 8/2017 | Hall-Snyder | | |

(Continued)

FOREIGN PATENT DOCUMENTS

| CN | 1259218 C | 6/2006 |
| CN | 208110079 U | 11/2018 |

*Primary Examiner* — Richard R. Green
(74) *Attorney, Agent, or Firm* — David R. Stevens; Stevens Law Group

(57) ABSTRACT

A cover for a rawinsonde balloon includes a cover main body with an inner surface forming inner space and an outer surface. The rawinsonde balloon is inserted into the inner space of the cover main body. Further, the cover includes an inlet, positioned at a preliminary free end of the cover main body, for allowing the rawinsonde balloon to be inserted into the inner space and the cover additionally includes an inlet control member for controlling a size of the inlet and fixing a controlled size of the inlet. Furthermore, the cover includes a plurality of basic cover fixing members formed or located respectively at a plurality of basic preliminary fixed ends on the outer surface.

9 Claims, 12 Drawing Sheets

(56) References Cited

U.S. PATENT DOCUMENTS

| | | | |
|---|---|---|---|
| 2003/0027652 A1* | 2/2003 | Chamberlain | B64B 1/58 |
| | | | 473/115 |
| 2007/0199503 A1 | 8/2007 | French | |
| 2014/0042042 A1 | 2/2014 | Devaul | |
| 2014/0124616 A1* | 5/2014 | Greco | B64B 1/58 |
| | | | 244/31 |
| 2015/0225091 A1 | 8/2015 | Ratner | |

* cited by examiner

COVER FOR PROTECTING RAWINSONDE BALLOON IN PREPARING FLIGHT OF RAWINSONDE BALLOON

CROSS REFERENCE TO RELATED APPLICATION

This application claims the benefit of the earlier filing date of Korean patent application No. 10-2020-0169953, filed Dec. 7, 2020, the entire contents of which being incorporated herein by reference.

FIELD OF THE DISCLOSURE

The present disclosure relates to a cover for protecting a rawinsonde balloon in preparing a flight of the rawinsonde balloon.

BACKGROUND OF THE DISCLOSURE

Aerological observation is an important meteorological observation method for accurately observing the meteorological situation changing in real-time, and the measurement of the upper atmosphere is performed by allowing a flight of a balloon connected to a rawinsonde.

Such an aerological observation is normally performed in a predetermined aerological observation center, but if there is a need for the observation to be carried out in special meteorological situation such as monsoon and heavy snowfall, it may also be carried out in a place that has not been designated.

However, if the aerological observation is carried out in a place that has not been designated, for example, outdoor, since the balloon is made of rubber material, risks for damages to the balloon caused by foreign substances on the ground or by wind always exist.

Accordingly, in carrying out the aerological observation, there is a need for a solution to protect the balloon from being damaged until the balloon is made to fly.

SUMMARY OF THE DISCLOSURE

It is an object of the present disclosure to solve all the aforementioned problems.

It is another object of the present disclosure to provide a method for determining locations of cover fixing members formed on a cover for protecting a rawinsonde balloon, such that the cover is allowed to be stably fixed with a balance of force.

It is still another object of the present disclosure to allow a cover to safely protect the rawinsonde balloon up to a point in time when the rawinsonde balloon is allowed to fly, by changing a mode in response to a change in the rawinsonde balloon accommodated in an inner space of the rawinsonde balloon.

In accordance with one aspect of the present disclosure, there is provided a cover for protecting a rawinsonde balloon in preparing a flight of the rawinsonde balloon, comprising: a cover main body with an inner surface thereof forming inner space therein and an outer surface thereof, wherein the rawinsonde balloon is to be inserted into the inner space of the cover main body; an inlet, which is positioned at a preliminary free end of the cover main body, for allowing the rawinsonde balloon to be inserted into the inner space, wherein the preliminary free end of the cover main body becomes to be a free end of the cover main body at a time when the rawinsonde balloon is allowed to fly; an inlet control member, buried at least in part inside the cover main body, for controlling a size of the inlet and fixing a controlled size of the inlet; and a first basic cover fixing member to an n-th basic cover fixing member formed respectively at a first basic preliminary fixed end to an n-th basic preliminary fixed end on the outer surface, wherein at least one of the first basic preliminary fixed end to the n-th basic preliminary fixed end becomes to be a fixed end of the cover main body at the time when the rawinsonde balloon is allowed to fly, and wherein n is an integer of 1 or more; wherein, on condition that the inlet has been fixed, in response to applying a first partial force vector to a k-th partial force vector respectively to a first specific basic cover fixing member to a k-th specific basic cover fixing member selected among the first basic cover fixing member to the n-th basic cover fixing member, wherein, k is an integer equal to or more than 1 and equal to or less than n, a direction of a first total force vector acquired by adding all the first partial force vector to the k-th partial force vector is opposite to a direction of from a virtual origin of the first total force vector to a center of the inlet, and wherein, in response to increasing a volume of the rawinsonde balloon in the inner space, the volume of the inner space is dynamically increased within a predetermined range of the volume thereof, and wherein a maximum value of the predetermined range of the volume is determined to be equal to or larger than a qualified volume that allows the flight of the rawinsonde balloon.

As one example, there is provided a cover wherein the outer surface includes: a first outer surface region which is a region closer to the inlet among two divided regions and a second outer surface region which is another region far away from the inlet among the two divided regions, wherein the two divided regions are acquired by dividing the outer surface on a basis of a virtual plane whose normal vector is parallel to the first total force vector, the virtual plane dividing the inner space in a predetermined ratio, and wherein each of the first basic preliminary fixed end to the n-th basic preliminary fixed end are located on the second outer surface region.

As one example, there is provided a cover wherein the cover allows the flight of the rawinsonde balloon by changing its mode in the order of: (i) a first mode in which the rawinsonde balloon without gas therein is accommodated in the inner space and at least part of a gas injection unit for injecting the gas into the rawinsonde balloon is exposed through the inlet, (ii) a second mode in which at least part of a gas injection device for spraying the gas is inserted into the gas injection unit and sprays the gas into the rawinsonde balloon, to thereby inflate the rawinsonde balloon, and at the same time the volume of the inner space is inflated to be corresponding to the inflation of the rawinsonde balloon, and (iii) a third mode in which the rawinsonde balloon is inflated up to the qualified volume or more and the inlet expands such that the rawinsonde balloon is allowed to pass therethrough.

As one example, there is provided a cover wherein, in each of the first mode, the second mode and the third mode, a size of the inlet is adjusted and fixed by the inlet control member such that the gas injection unit and the inlet are tightly in contact with each other, and wherein, in the third mode, in response to releasing the inlet control member, (i) the preliminary free end is allowed to face toward sky as a free end by buoyancy generated due to the rawinsonde balloon and (ii) the inlet expands to an extent that the rawinsonde balloon is allowed to pass therethrough by the buoyancy.

As one example, there is provided a cover wherein a rope for connecting a predetermined observation device and the rawinsonde balloon is engaged with the gas injection unit or a predetermined parachute which is connected with the rawinsonde balloon, before the inlet control member is released on condition that the cover has changed to the third mode.

As one example, there is provided a cover wherein a first additional cover fixing member to a p-th additional cover fixing member are additionally formed respectively at a first additional preliminary fixed end to a p-th additional preliminary fixed end on the outer surface, wherein at least one of the first additional preliminary fixed end to the p-th additional preliminary fixed end becomes to be the fixed end of the cover main body at the time when the rawinsonde balloon is allowed to fly, and wherein p is an integer of 1 or more; wherein (i) each of one ends of the first additional cover fixing member to the p-th additional cover fixing member is fixed respectively by coupling said each of one ends thereof to the first additional preliminary fixed end to the p-th additional preliminary fixed end, (ii) at least part of the other ends of the first additional cover fixing member to the p-th additional cover fixing member respectively has a first hook-and-loop fastener member (e.g., a Velcro® member) formed thereon, and (iii) on the outer surface, at a first hook-and-loop fastener detachable location to a p-th hook-and-loop fastener detachable location which are respectively distanced from the first additional preliminary fixed end to the p-th additional preliminary fixed end as much as respective lengths of the first additional cover fixing member to the p-th additional cover fixing member, a second hook-and-loop fastener member detachable to the first hook-and-loop fastener member is formed, such that the respective other ends of the first additional cover fixing member to the p-th additional cover fixing member are detachable, and wherein, in response to respectively applying the first partial force vector to the k-th partial force vector to the first specific basic cover fixing member to the k-th specific basic cover fixing member and additionally respectively applying a (k+1)-th partial force vector to a (k+q)-th partial force vector to a first specific additional cover fixing member to a q-th specific additional cover fixing member which are selected among the first additional cover fixing member to the p-th additional cover fixing member, wherein q is an integer of 1 or more and p or less, each of a first specific additional preliminary fixed end to a q-th specific additional preliminary fixed end corresponding to each of the first specific additional cover fixing member to the q-th specific additional cover fixing member is determined such that a second total force vector acquired by adding all of (i) each of the first partial force vector to the k-th partial force vector and (ii) each of the (k+1)-th partial force vector to the (k+q)-th partial force vector is opposite to a direction of from a virtual origin of the second total force vector to the center of the inlet.

As one example, there is provided a cover wherein at least one of the first basic cover fixing member to the n-th basic cover fixing member is a predetermined hook-and-loop fastener-inclusive cover fixing member, wherein the hook-and-loop fastener-inclusive cover fixing member has (i) one end fixed by engaging it with any one, corresponding to the hook-and-loop fastener-inclusive cover fixing member, among the first basic preliminary fixed end to the n-th basic preliminary fixed end, (ii) at least part of the other end on which a first hook-and-loop fastener member is formed, and wherein (iii) on the outer surface, at a hook-and-loop fastener detachable location distanced from the one end of the hook-and-loop fastener-inclusive cover fixing member as much as a length of the hook-and-loop fastener inclusive cover fixing member along the outer surface, a second hook-and-loop fastener member detachable to the first hook-and-loop fastener member is formed, such that the other end of the hook-and-loop fastener inclusive cover fixing member is detachable.

As one example, there is provided a cover wherein the outer surface is made of waterproof material, and wherein the inner surface is (i) made of a predetermined material that reduces friction to be generated between the rawinsonde balloon and the inner surface and (ii) coated with a substance in form of powder having properties that do not agglomerate by moisture, wherein the substance in the form of powder having properties that do not agglomerate by moisture includes talcum powder, in order to alleviate the friction within a predetermined value.

As one example, there is provided a cover wherein the first basic cover fixing member to the n-th basic cover fixing member are respectively formed on fixed locations on the outer surface.

As one example, there is provided a cover wherein the outer surface has a first location moving structure to a j-th location moving structure, wherein said j is an integer of 1 or more and n or less, wherein first basic cover fixing member to the n-th basic cover fixing member are respectively classified into a first cluster to a j-th cluster such that at least one does not overlap with another, and are respectively movably coupled with the first location moving structure to the j-th location moving structure respectively corresponding to the first cluster to the j-th cluster, and wherein the first specific basic preliminary fixed end to the k-th specific basic preliminary fixed end are respectively determined dynamically depending on locations where the first specific basic cover fixing member to the k-th specific basic cover fixing member respectively corresponding thereto are moved and then arrived by the first partial force vector to the k-th partial force vector.

BRIEF DESCRIPTION OF THE DRAWINGS

The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
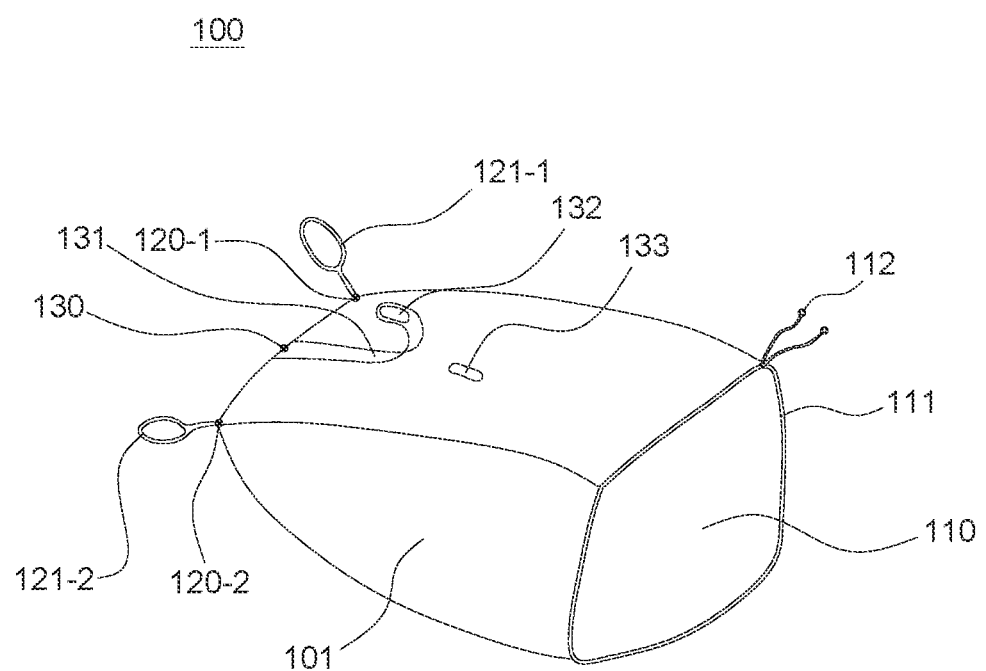
FIG. 1 is a drawing schematically representing a cover for protecting a rawinsonde balloon in accordance with one example embodiment of the present invention.

In the following detailed description, reference is made to the accompanying drawings that show, by way of illustration, specific embodiments in which the invention may be practiced. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Furthermore, the present invention includes all possible combinations of embodiments indicated in the present disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached diagrams will be explained in detail as shown below.

FIG. 1 is a drawing schematically representing a cover for protecting a rawinsonde balloon in accordance with one example embodiment of the present invention.

Referring to FIG. 1, in accordance with one example embodiment of the present invention, a cover 100 for protecting a rawinsonde balloon in preparing a flight of the rawinsonde balloon may include a cover main body 101 with an inner surface thereof forming inner space therein and an outer surface thereof. Herein the rawinsonde balloon is to be inserted into the inner space of the cover main body 101. In addition, the outer surface of the cover main body 101 may have one or more basic cover fixing members 121-1, 121-2 formed thereon. Herein the cover fixing members 121-1, 121-2 are members capable of pulling and fixing the cover main body 101. FIG. 1 illustrates the cover fixing members 121-1, 121-2 in a form of a ring, but it is not limited thereto. As another example, the basic cover fixing members 121-1, 121-2 may include only a connecting structure capable of connecting separate members (for example, rings, etc. of metallic material), and the cover main body (101) may be pulled and fixed by a separate fixing member connected to the connecting structure. Herein, the expression "basic" is used in order to be distinguished from "additional cover fixing members" which should be distinguished from the basic cover fixing members below.

In addition, the basic cover fixing members 121-1, 121-2 may be formed respectively at their corresponding basic preliminary fixed ends 120-1, 120-2. In addition, the cover main body 101 may have at least one additional cover fixing member 131 such as a predetermined hook-and-loop fastener member formed at its corresponding additional preliminary fixed end 130. Herein, the additional cover fixing member 131 may be configured as a different shape from the basic cover fixing members 121-1, 121-2. The additional cover fixing member 131 will be explained in further detail below.

In addition, an inlet 110 may be formed, at a preliminary free end which is a predetermined location of the cover main body 101, for allowing the rawinsonde balloon to be inserted into the inner space of the cover main body 101. Herein, the preliminary free end of the cover main body 101 may become to be a free end of the cover main body 101 at a time when the rawinsonde balloon is allowed to fly.

For reference, the preliminary free end may not always be a free end depending on a working condition before the rawinsonde balloon is allowed to fly, and thus the expression "preliminary" was used. This equally applies to the "preliminary fixed end" which is to be explained below. As another example, the "free end" and the "fixed end" of the cover main body 101 may be made of one or more materials whose forms may be varied (for example, vinyl fiber, etc.)

without forming their corresponding solid ends. In such a case, the "free end" and the "fixed end" may be considered as their corresponding regions on the cover main body 101. Further, some regions corresponding to the "free end" may include not only a region whose form is freely changeable but also a region of "semi-free end" with a restriction in its changeable range.

Next, an inlet control member 112 may be buried inside of an inlet control region 111 corresponding to the inlet 110 of the cover main body 101. The inlet control member can control a size of the inlet 110 and fixes a controlled size of the inlet 110. As another example, the inlet control member 112 may be buried at least in part, and the rest thereof may be exposed. FIG. 1 shows an example of the inlet control member 112 in a form of a strap, but it is not limited thereto, and a different member capable of performing the same purpose may be used.

In addition, as one example of the present invention, the outer surface of the cover main body 101 may be made of a waterproof material. In addition, the inner surface of the cover main body 101 may be (i) made of a predetermined material that reduces friction to be generated between the rawinsonde balloon and the inner surface and (ii) coated with a substance in form of powder having properties that do not agglomerate by moisture, in order to alleviate the friction within a predetermined value. For example of the substance in the form of powder having properties that do not agglomerate by moisture, talcum powder may be introduced, but it is not limited thereto.

In addition, as another example of the present invention, in response to increasing a volume of the rawinsonde balloon in the inner space of the cover main body 101 in preparing a flight of the rawinsonde balloon, the volume of the inner space may be dynamically increased within a predetermined range of the volume thereof. Herein, a maximum value of the predetermined range of the volume is determined to be equal to or larger than a qualified volume that allows the flight of the rawinsonde balloon. The rawinsonde balloon thereby may have its volume increased to be equal to or larger than the qualified volume even when it is accommodated in the inner space, and thus it can be protected by the cover main body 101 to a point of time of flight.

Next, the cover 100 may change its mode in an order of a first mode, a second mode and a third mode while processes of accommodating the rawinsonde balloon inside the cover and injecting the predetermined gas into the rawinsonde balloon to thereby allow the rawinsonde balloon to fly are proceeding, and this is described in detail as follows.

Figure 2A:
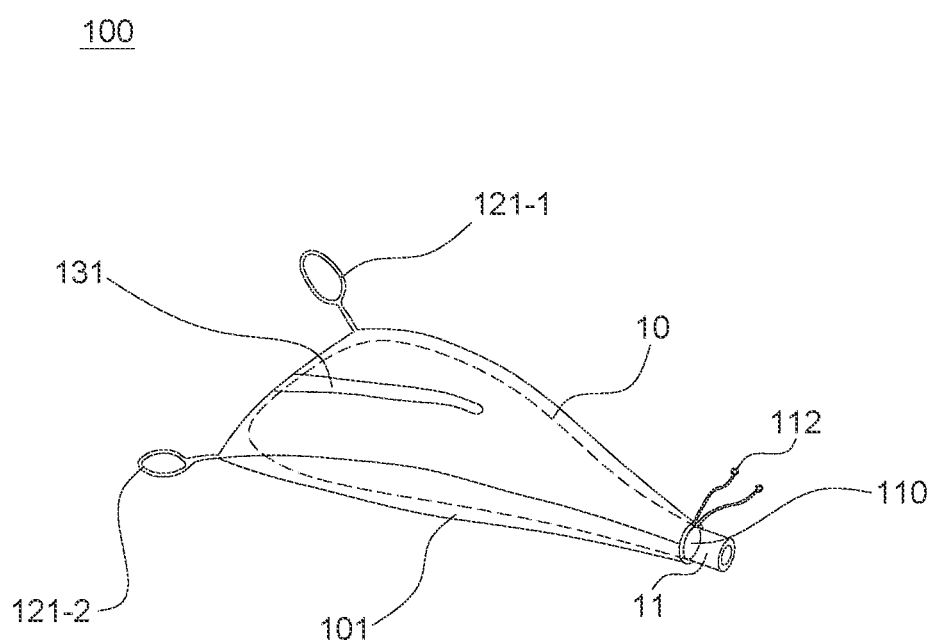
FIG. 2A is a drawing schematically representing a first mode in which the rawinsonde balloon is accommodated in the inner space of the cover in a process of preparing a flight of the rawinsonde balloon in accordance with one example embodiment of the present invention.
Figure 2B:
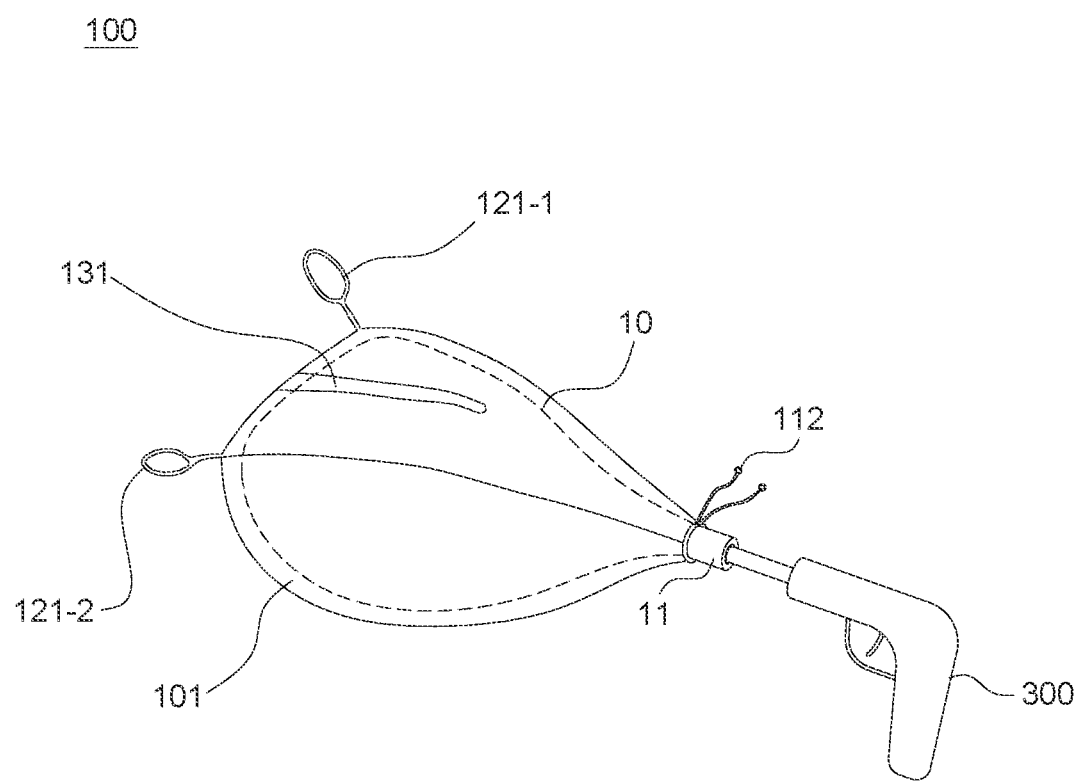
FIG. 2B is a drawing schematically representing a second mode in which a predetermined gas is injected into the rawinsonde balloon accommodated in the inner space of the cover in the process of preparing the flight of the rawinsonde balloon in accordance with one example embodiment of the present invention.
Figure 2C:
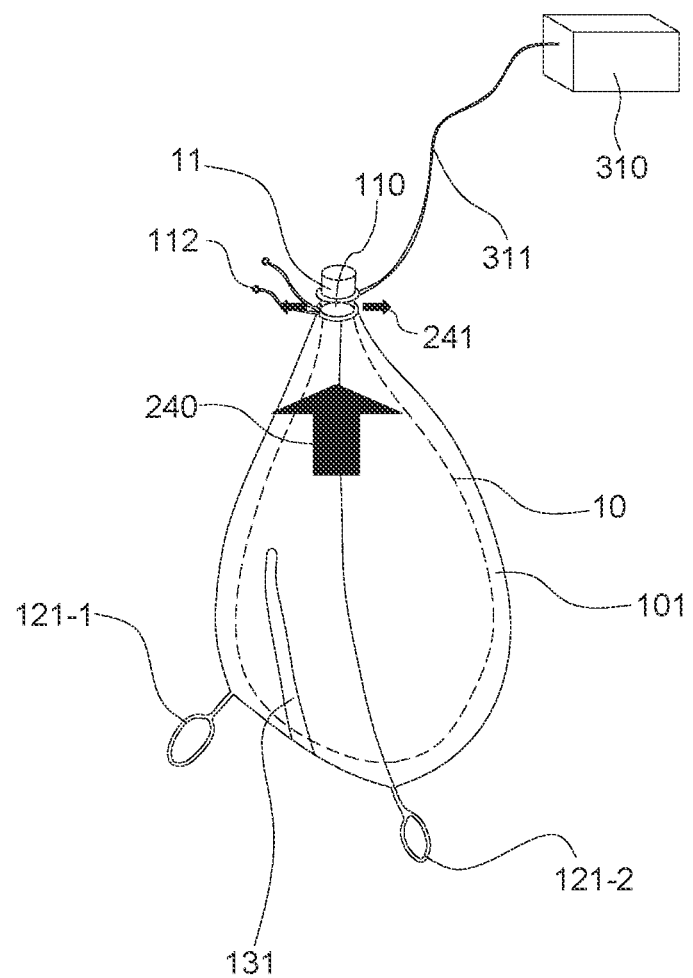
FIG. 2C is a drawing schematically representing a third mode in which the rawinsonde balloon accommodated in the inner space of the cover in the process of preparing the flight of the rawinsonde balloon is inflated up to the qualified volume or more such that the rawinsonde balloon is allowed to fly in accordance with one example embodiment of the present invention.

FIG. 2A is a drawing schematically representing the first mode in which the rawinsonde balloon is accommodated in the inner space of the cover in a process of preparing the flight of the rawinsonde balloon in accordance with one example embodiment of the present invention, FIG. 2B is a drawing schematically representing the second mode in which the predetermined gas is injected into the rawinsonde balloon accommodated in the inner space of the cover in the process of preparing the flight of the rawinsonde balloon in accordance with one example embodiment of the present invention, and FIG. 2C is a drawing schematically representing the third mode in which the rawinsonde balloon accommodated in the inner space of the cover in the process of preparing the flight of the rawinsonde balloon is inflated up to the qualified volume or more such that the rawinsonde balloon is allowed to fly in accordance with one example embodiment of the present invention.

Firstly, referring to FIG. 2A, in the process of preparing the flight of the rawinsonde balloon, the cover 100 may be in the first mode in which the rawinsonde balloon 10 without gas therein is accommodated in the inner space of the cover main body 101, and at least part of the gas injection unit 11 for injecting the gas into the rawinsonde balloon 10 is exposed through the inlet 110. In the first mode, since the gas has not been inserted into the rawinsonde balloon 10, its volume may be close to 0, and therefore, the inner space of the cover main body 101 may also have little volume therein. FIG. 2A shows a state of the cover main body 101 being flat as an example, but unlike this, depending on the working condition, the cover main body 101 may be made of hard material capable of maintaining a fixed form such that a predetermined minimum volume may be secured without being flat even if the volume of the rawinsonde balloon 10 is close to 0. In addition, by allowing the gas injection unit 11 to be exposed through the inlet 110, the worker may carry out the work without going into the cover 100 in the process of injecting the gas into the rawinsonde balloon 10.

Next, referring to FIG. 2B, the cover 100 in the first mode may change its mode to the second mode in which at least part of a gas injection device 300 is inserted into the gas injection unit 11 and sprays the gas into the rawinsonde balloon 10, to thereby inflate the rawinsonde balloon 10, and at the same time the volume of the inner space is inflated to be corresponding to the inflation of the rawinsonde balloon 10.

Then, referring to FIG. 2C, the cover 100 in the second mode may change its mode to the third mode in which the rawinsonde balloon 10 is inflated up to the qualified volume or more and the inlet 110 expands such that the rawinsonde balloon 10 is allowed to pass therethrough. Herein, as one example of the present invention, in response to releasing the inlet control member 112 of the cover 100 in the third mode, (i) the preliminary free end corresponding to the inlet 100 is allowed to face toward sky as a free end by buoyancy 240 generated due to the rawinsonde balloon 10 and (ii) the inlet 110 expands to an extent that the rawinsonde balloon 10 is allowed to pass therethrough by receiving pressure 241 from the buoyancy 240 generated due to the rawinsonde balloon 10. That is, in the second mode, while the inlet 100 is not in a direction toward sky, (i) the gas injection device 300 inserted into the gas injection unit 11 completes the gas injection and is removed, (ii) the force having been applied to fix the gas injection unit 11 is removed such that the preliminary free end corresponding to the inlet 110 becomes free to move, and (iii) the inlet control member 112 is released and the size of the inlet 100 may be freely controlled. Then, the inlet 110 is induced in a direction toward sky by the buoyancy 240 of the rawinsonde balloon 10 facing toward sky, and at the same time, the size of the inlet 110 may gradually increase by a pressure 241 applied by the rawinsonde balloon which is going to move outside from the inside. Accordingly, the rawinsonde balloon 10 may be protected by the cover 100 until it flies.

In addition, as another example of the present invention, a meteorological observation device 310 (for example, a rawinsonde) and the rawinsonde balloon 10 may be connected by a rope 311. Herein, the rope may be engaged with the gas injection unit 11 or a parachute which is connected with the rawinsonde balloon 10, before the inlet control member 112 is released, on condition that the cover 100 has changed to the third mode.

Next, as still another example, in each of the first mode, the second mode and the third mode, a size of the inlet 110 may be adjusted and fixed by the inlet control member 112 such that the gas injection unit 11 and the inlet 110 are tightly in contact with each other.

Figure 3A:
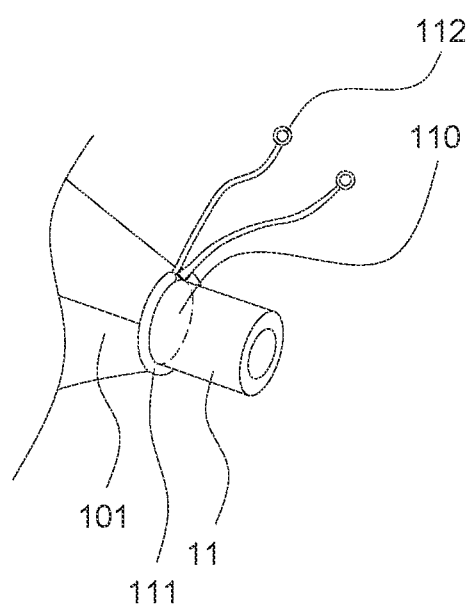
FIG. 3A is a drawing schematically representing a state that a size of an inlet is adjusted and fixed by an inlet control member such that a gas injection unit of the rawinsonde balloon and the inlet of the cover are tightly in contact with each other in accordance with one example embodiment of the present invention.
Figure 3B:
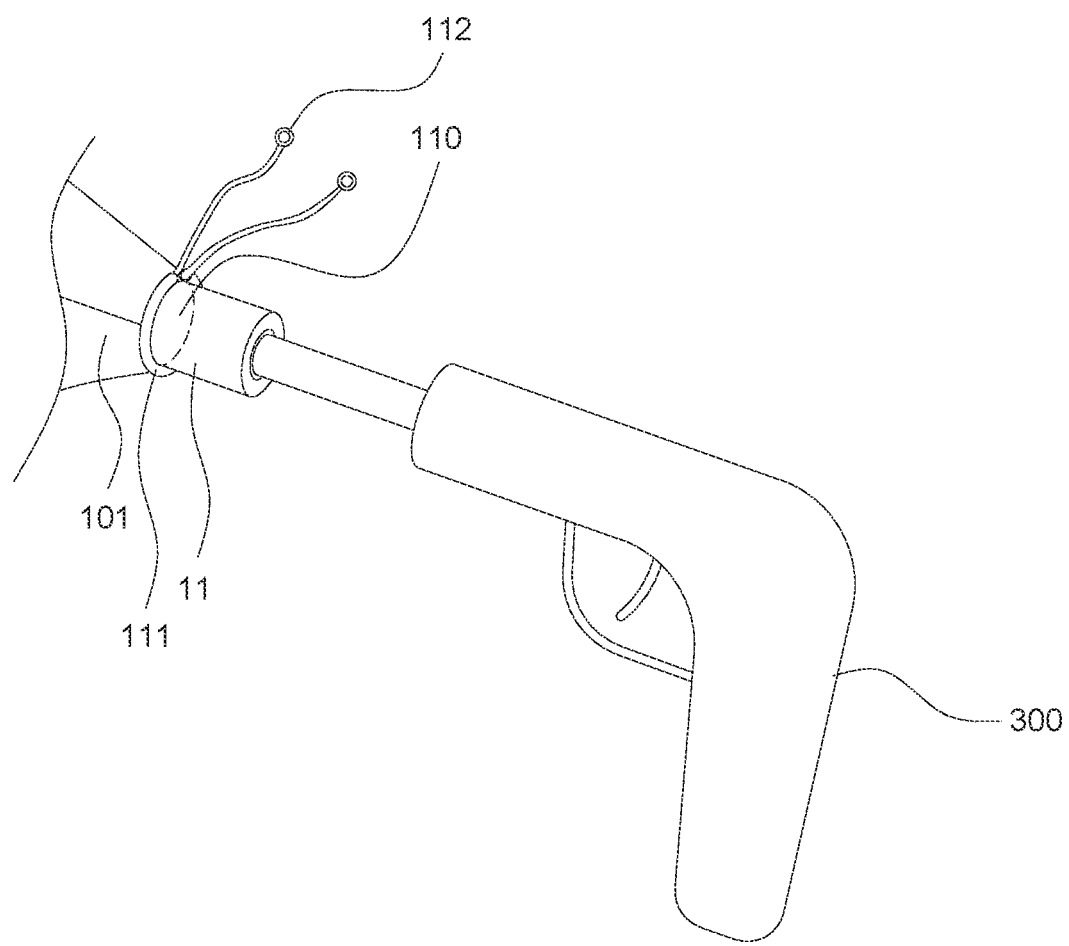
FIG. 3B is a drawing schematically representing a state that at least part of a gas injection device is inserted into the gas injection unit of the rawinsonde balloon and sprays a predetermined gas into the rawinsonde balloon in accordance with one example embodiment of the present invention.

FIG. 3A is a drawing schematically representing a state that a size of the inlet is adjusted and fixed by the inlet control member such that the gas injection unit of the rawinsonde balloon and the inlet of the cover are tightly in contact with each other in accordance with one example embodiment of the present invention, and FIG. 3B is a drawing schematically representing a state that at least part of the gas injection device is inserted into the gas injection unit of the rawinsonde balloon and sprays the gas into the rawinsonde balloon in accordance with one example embodiment of the present invention.

Referring to FIG. 3A, the inlet 110 may be fixed with its size having been controlled by the inlet control member 112 such that the gas injection unit 11 exposed through the inlet 110 and the inlet 110 are tightly in contact with each other. This is in order to avoid the wind getting into a gap between an outer surface of the rawinsonde balloon 10 and the inner space of the cover main body 101 in the process of preparing the flight of the rawinsonde balloon 10, and prevent the rawinsonde balloon 10 or the cover main body 101 from unintentionally moving by the wind outside.

However, referring to FIG. 3B, the size of the inlet 110 may be controlled and fixed to an extent that the gas sprayed by the gas injection device 300 can pass therethrough, but this extent may vary depending on the working condition.

Next, it is explained below in detail as to a method for fixing the cover main body 101 with a balance of force by using various cover fixing members.

Firstly, referring to FIG. 1 again, on the outer surface of the cover 100, as explained above, the basic cover fixing members 121-1, 121-2 and the additional cover fixing member 131 may be formed. Herein, in case the basic cover fixing members include n members, wherein n is an integer of 1 or more, they can be respectively called as a first basic cover fixing member to an n-th basic cover fixing member and they may be formed respectively at the first basic preliminary fixed end to the n-th basic preliminary fixed end on the outer surface of the cover main body 101. In addition, at least one of the first basic preliminary fixed end to the n-th basic preliminary fixed end may become to be a fixed end of the cover main body 101 at the time when the rawinsonde balloon is allowed to fly, to thereby avoid the cover main body 101 being pulled up to the sky together with the rawinsonde balloon 10 by the help of the basic cover fixing members respectively formed at the basic preliminary fixed ends at a point of time the rawinsonde balloon is allowed to fly.

In addition, on condition that the inlet 110 has been fixed, in response to applying a first partial force vector to a k-th partial force vector respectively to a first specific basic cover fixing member to a k-th specific basic cover fixing member selected among the first basic cover fixing member to the n-th basic cover fixing member to thereby pull and fix the cover main body 101 (wherein k is an integer equal to or more than 1 and equal to or less than n), a direction of a first total force vector acquired by adding all the first partial force vector to the k-th partial force vector is opposite to a direction of from a virtual origin of the first total force vector to a center of the inlet. Herein, the location of the inlet 110 being fixed means, not that the inlet is to maintain a completely fixed state, but means that the inlet 101 or the gas injection unit 11 exposed through the inlet 101 is fixed in order to avoid the location of the inlet 101 being changed by the first total force vector, and thus the inlet may be tilted at said location or its size may be changed. In addition, on condition that the inlet 101 has been fixed, the first total force vector works in the opposite direction of from the virtual origin of the first total force vector to the center of the inlet, and thus according to the principal of action and reaction, an opposite vector works from the virtual origin of the first total force vector to the center of the inlet in the same magnitude as the first total force vector at the inlet 110. Accordingly, the two vectors form a balance of force with each other.

That is, the first total force vector must be a vector having the opposite direction of from the virtual origin of the first total force vector to the center of the inlet 110 in order to form the balance of force with respect to the cover main body 101 such that the cover main body 101 is stably fixed. Thus, in response to applying the first partial force vector to the k-th partial force vector to fix the cover main body 101, locations of the first specific basic cover fixing member to the k-th specific basic cover fixing member for forming the balance of force may be determined such that the balance of force is formed between the first total force vector and an opposite vector acquired by adding the first partial force vector to the k-th partial force vector. If the balance of force is not formed between the first total force vector and the opposite vector, the cover main body 101 may be rotated due to unbalance of force.

In addition, as another example of the present invention, in case it is assumed that two divided regions are acquired by dividing the outer surface of the cover main body 101 on a basis of a virtual plane whose normal vector is parallel to the first total force vector, the virtual plane dividing the inner space in a predetermined ratio, the outer surface may be comprised of a first outer surface region which is a region closer to the inlet 110 among the two divided regions and a second outer surface region which is the other region far away from the inlet 110 among the two divided regions. Then, each of the first basic preliminary fixed end to the n-th basic preliminary fixed end may be located only on the second outer surface region. This is in order to increase a degree of freedom of the inlet 101 functioning as a free end at a point of time the rawinsonde balloon 10 accommodated in the inner space of the cover main body 101 flies by locating at least one among the first basic preliminary fixed end to the n-th basic preliminary fixed end functioning as the fixed end to be far away from the inlet. Herein, the ratio that the virtual plane divides the inner space of the cover main body 101 and the sizes of the first outer surface region and the second outer surface region according thereto may be determined differently depending on the working condition.

In addition, as another example of the present invention, on the outer surface of the cover main body 101, the additional cover fixing member 131 having a different form from the basic cover fixing members may be formed. For example, p pieces of additional cover fixing members may be formed. Herein, p is an integer of 1 or more. The p pieces of the additional cover fixing members, i.e., a first additional cover fixing member to a p-th additional cover fixing member, may be formed respectively at a first additional preliminary fixed end to a p-th additional preliminary fixed end on the outer surface of the cover main body 101. In addition, at least one of the first basic preliminary fixed end to the n-th basic preliminary fixed end may become to be at least one additional fixed end at the time when the rawinsonde balloon is allowed to fly.

In addition, (i) each of one ends of the first additional cover fixing member to the p-th additional cover fixing member may be fixed respectively by engaging said each of one ends thereof with the first additional preliminary fixed end to the p-th additional preliminary fixed end, (ii) at least part of the other ends of the first additional cover fixing member to the p-th additional cover fixing member may have at least one first hook-and-loop fastener member formed thereon, and (iii) on the outer surface, at a first hook-and-loop fastener detachable location to a p-th hook-and-loop fastener detachable location which are respectively distanced from the first additional preliminary fixed end to the p-th additional preliminary fixed end as much as respective lengths of the first additional cover fixing member to the p-th additional cover fixing member, at least one second hook-and-loop fastener member detachable to the first hook-and-loop fastener member may be formed, such that the respective other ends of the first additional cover fixing member to the p-th additional cover fixing member may be detachable. FIG. 1 shows one end of one additional cover fixing member 131 is engaged with one additional preliminary fixed end 130, and the other end of one additional cover fixing member 131 has the first hook-and-loop fastener member 132 formed thereon, and the second hook-and-loop fastener member 133 is formed on a hook-and-loop fastener detachable location which is distanced as much as the length of the one additional cover fixing member 131.

In addition, in case the first additional cover fixing member to the p-th additional cover fixing member are additionally formed as described above, in response to applying a (k+1)-th partial force vector to a (k+q)-th partial force vector respectively to a first specific additional cover fixing member to a q-th specific additional cover fixing member which are selected among the first additional cover fixing member to the p-th additional cover fixing member, wherein q is an integer of 1 or more and p or less, each of a first specific additional preliminary fixed end to a q-th specific additional preliminary fixed end corresponding to each of the first specific additional cover fixing member to the q-th specific additional cover fixing member may be determined such that a second total force vector acquired by adding all of (i) each of the first partial force vector to the k-th partial force vector and (ii) each of the (k+1)-th partial force vector to the (k+q)-th partial force vector is opposite to a direction of from a virtual origin of the second total force vector to the center of the inlet. That is, each of the (k+1)-th partial force vector to the (k+q)-th partial force vector may be applied respectively to each of the first specific additional cover fixing member to the q-th specific additional cover fixing member. Since each of the (k+1)-th partial force vector to the (k+q)-th partial force vector is applied to the cover main body 101 in addition to each of the first partial force vector to the k-th partial force vector applied to the cover main body 101 through each of the first basic cover fixing member to the k-th basic cover fixing member, the second total force vector acquired by adding all of (i) each of the first partial force vector to the k-th partial force vector and (ii) each of the (k+1)-th partial force vector to the (k+q)-th partial force vector must form a balance of force with respect to the cover main body 101. This is similar to the description on the first total force vector forming the balance of force, and thus further description thereon shall be omitted.

In addition, as still another example, at least one of the first basic cover fixing member to the n-th basic cover fixing member may be a predetermined hook-and-loop fastener-inclusive cover fixing member. Herein, the "hook-and-loop fastener-inclusive cover fixing member" means a cover fixing member such as the "additional covering fixing member" including the first hook-and-loop fastener member. But the additional cover fixing member is a concept of being additionally formed supposing that at least one basic cover fixing member is provided, whereas the hook-and-loop fastener-inclusive cover fixing member in this example is different in that it is a concept of being at least one of the basic cover fixing members. Thus a case in which only one hook-and-loop fastener-inclusive cover fixing member exists on the outer surface of the cover main body 101 and a partial force vector applies only to said only one hook-and-loop fastener-inclusive cover fixing member in order to fix the cover main body 101 may also be included. Since such a hook-and-loop fastener-inclusive cover fixing member is at least one of the first basic cover fixing member to the n-th basic cover fixing member, a balance of force being formed by the partial force vectors applied thereto is similar to the description above in the case of the basic cover fixing members. Thus the detailed description in this regard shall be omitted.

Figure 6:
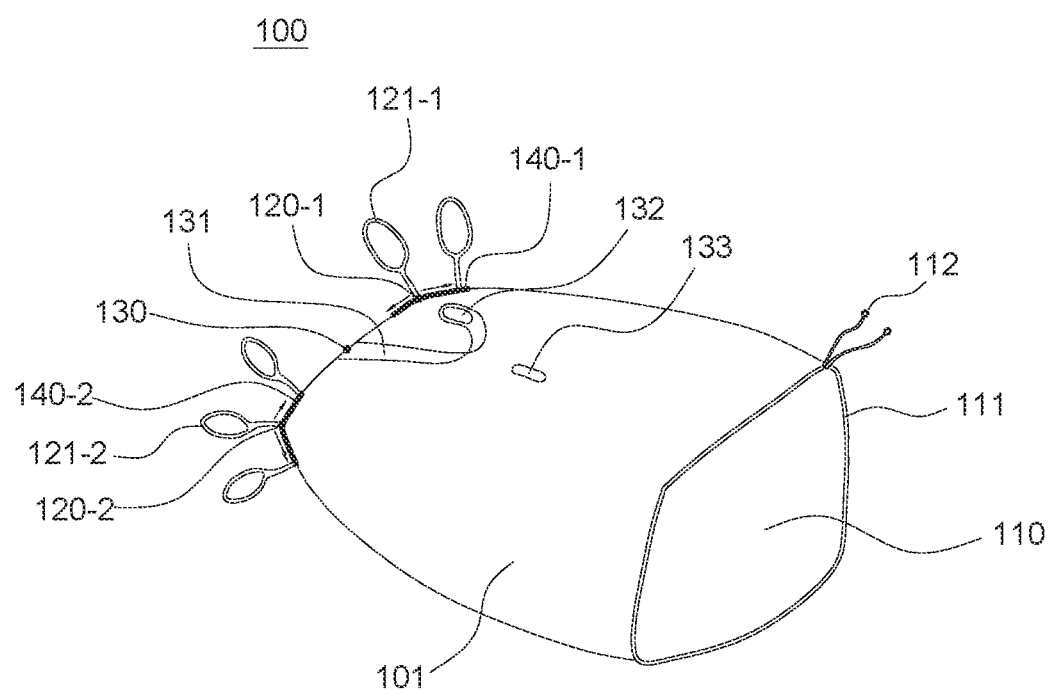
FIG. 6 is a drawing schematically representing a cover for protecting a rawinsonde balloon, on which at least one guiding member is formed in accordance with one example embodiment of the present invention.

In the above, one example of the present invention in which each of the first basic cover fixing member to the n-th basic cover fixing member is respectively formed on each of fixed locations on the outer surface of the cover main body 101 was supposed for explanation, but as another example of the present invention in FIG. 6, the outer surface of the cover main body 101 may have j pieces of guiding members 140-1, 140-2 (a first guiding member to a j-th guiding member), wherein said j is an integer of 1 or more and n or less. Herein, n pieces of the basic cover fixing members (i.e., the first basic cover fixing member to the n-th basic cover fixing member) may be respectively classified into a first cluster to a j-th cluster such that at least one does not overlap with another, and the first basic cover fixing member to the n-th basic cover fixing member may be movably coupled with the first guiding member to the j-th guiding member respectively corresponding to the first cluster to the j-th cluster. For example, when the first basic cover fixing member and the second basic cover fixing member are included in the first cluster, the first basic cover fixing member and the second basic cover fixing member are movably coupled with the first guiding member, and the locations of the first basic cover fixing member and the second basic cover fixing member may move along the first guiding member. In such a case, among the n basic cover fixing members, k pieces of the specific basic cover fixing members are used for fixing the cover main body 101 by respectively applying the first partial force vector to the k-th partial force vector thereto. Herein, (i) in response to applying the first partial force vector to the k-th partial force vector respectively to the first specific basic cover fixing member to the k-th specific basic cover fixing member, the first specific basic cover fixing member to the k-th specific basic cover fixing member are slidably moved along their corresponding specific guiding members among the first guiding member to the j-th guiding member, and then (ii) in response to determining that the first specific basic cover fixing member to the k-th specific basic cover fixing member are respectively arrived at a first location to a k-th location where the first specific basic cover fixing member to the k-th specific basic cover fixing member are no longer slidably moved due to a balance of force formed between the first total force vector and the opposite vector acquired by adding the first partial force vector to the k-th partial force vector, the first location to the k-th location are respectively determined as the first specific basic preliminary fixed end to a k-th specific basic preliminary fixed end.

As explained above, various examples where a balance of force is made with respect to the cover main body 101 will be specifically explained with reference to separate drawings (FIG. 4A to FIG. 4C) below.

Figure 4A:
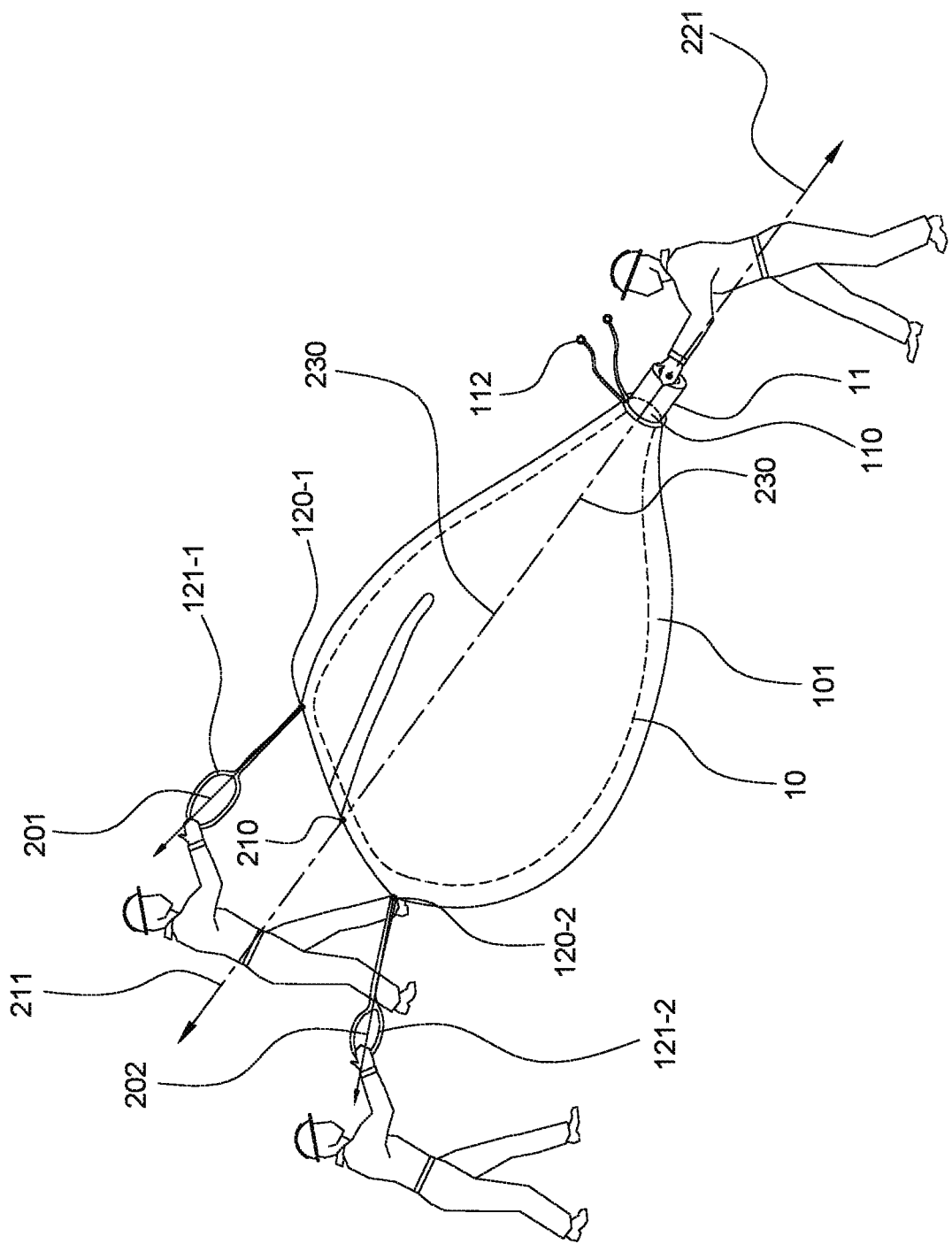
FIG. 4A is a drawing schematically representing a state of a balance of force being made while the cover is fixed by three workers in accordance with one example embodiment of the present invention.
Figure 4B:
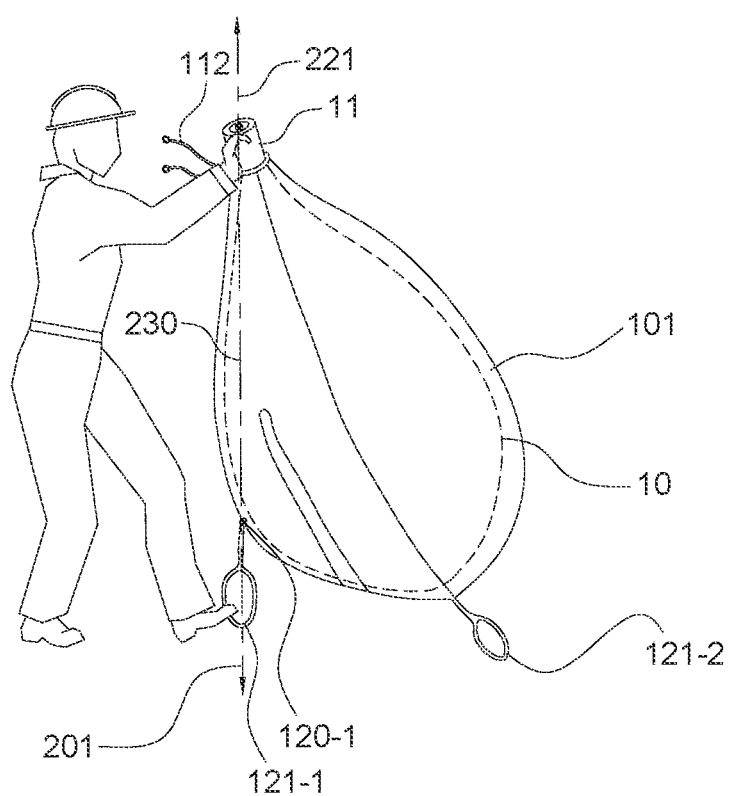
FIG. 4B is a drawing schematically representing a state of the balance of force being made while the cover is fixed by one worker in accordance with one example embodiment of the present invention.
Figure 4C:
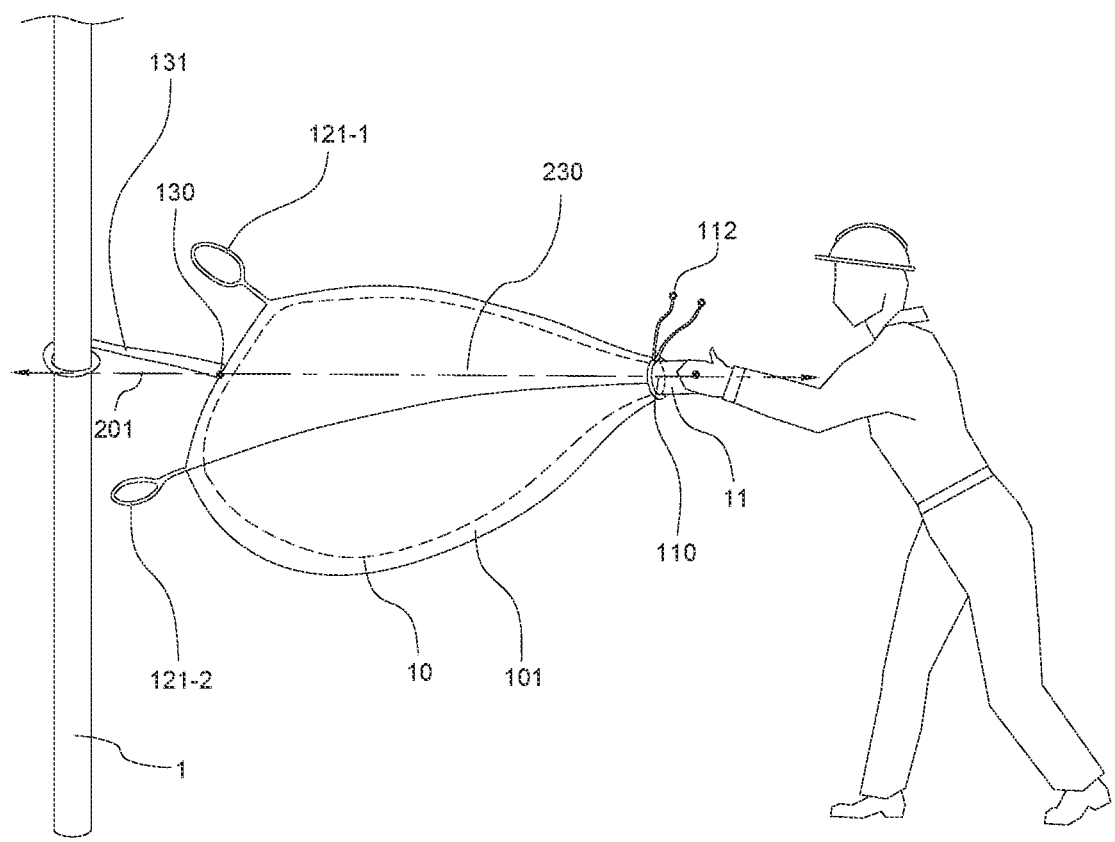
FIG. 4C is a drawing schematically representing a state of the balance of force being made while the cover is fixed by external fixture and one worker in accordance with one example embodiment of the present invention.

FIG. 4A is a drawing schematically representing a state of a balance of force being made while the cover is fixed by three workers in accordance with one example embodiment of the present invention, FIG. 4B is a drawing schematically representing a state of the balance of force being made while the cover is fixed by one worker in accordance with one example embodiment of the present invention, and FIG. 4C is a drawing schematically representing a state of the balance of force being made while the cover is fixed by external fixture and one worker in accordance with one example embodiment of the present invention.

Firstly, referring to FIG. 4A, as one example embodiment of the present invention, on condition that one worker has fixed the inlet 110 or the gas injection unit 11 exposed through the inlet 110, in response to applying the first partial force vector 201 and the second partial force vector 202 respectively to the first basic cover fixing member 121-1 and the second basic cover fixing member 121-2 by two workers located in the opposite side of the inlet 110, according to the principal of action and reaction, the balance of force is formed between an opposite vector 221 and the first total force vector 211 acquired by adding the first partial force vector 201 and the second partial force vector 202. Herein, the first total force vector 211 must be in parallel to a virtual straight line 230 connecting the center of the inlet 110 and the virtual origin 210 of the first total force vector 211, to thereby form the balance of force. In addition, if at least one of (i) a size and a direction of the first partial force vector 201, (ii) a size and a direction of the second partial force vector 202, and (iii) a distance to the virtual straight line 230 is changed, the locations of the first basic preliminary fixed end and the second basic preliminary fixed end may be varied from the locations thereof shown in FIG. 4A.

Next, referring to FIG. 4B, as another example embodiment of the present invention, while one worker has fixed the inlet 110 and the gas injection unit 11 exposed therefrom with hands, the worker may fix the first basic cover fixing member 121-1 which is closer one between the first basic cover fixing member 121-1 and the second basic cover fixing member 121-2 by stepping on it with a foot. In such a case, the first partial force vector 201 becomes equal to the first total force vector, and thus the first partial force vector 201 must work in a direction parallel to the virtual straight line 230 to form the balance of force with respect to the cover main body 101. In such a case, as shown in FIG. 4B, the cover main body 101 may be tilted toward the worker to form the balance of force.

In addition, referring to FIG. 4C, as still another example embodiment of the present invention, one worker may fix the inlet 110 or the gas injection unit 11 exposed through the inlet 110, while the additional cover fixing member 131 is tied to a predetermined external fixture 1 such as a pillar to form the balance of force with respect to the cover main body 101. In this case, the first partial force vector 201 is not firstly applied to the additional cover fixing member 131, but the worker may pull the inlet 110 or the gas injection unit 11 exposed through the inlet 110 in the direction opposite to the first partial force vector 201, and according to the principal of action and reaction, the first partial force vector 201 is generated. In addition, as shown in FIG. 4C, if there is one additional cover fixing member 131, the first partial force vector 201 working on the additional cover fixing member 131 is equal to the first total force vector, and thus the balance of force may be formed with respect to the cover main body 101 such that the first partial force vector 201 works in a direction parallel to the virtual straight line 230 connecting the center of the inlet 110 and the first basic preliminary fixed end 130.

Figure 5A:
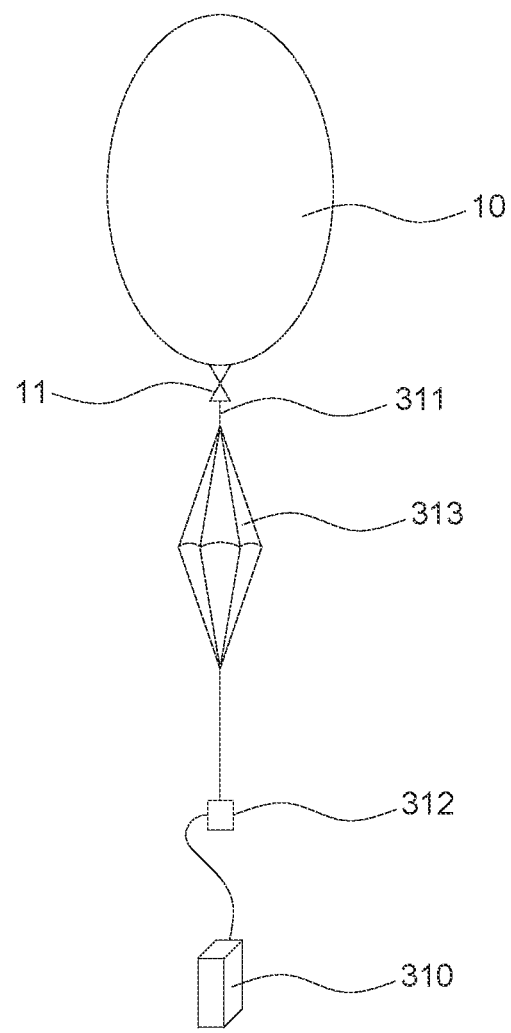
FIG. 5A is a drawing schematically representing a state of the rawinsonde balloon made to fly by the predetermined gas being injected thereinto while a predetermined parachute is connected with the rawinsonde balloon in accordance with one example embodiment of the present invention.
Figure 5B:
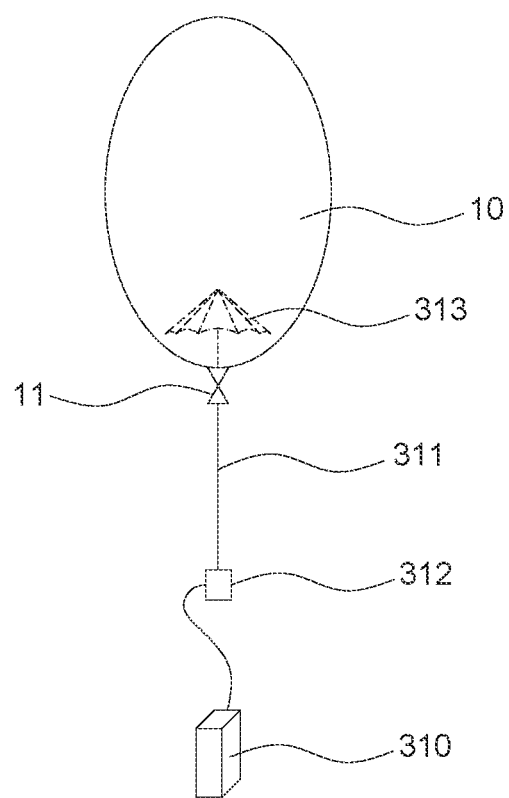
FIG. 5B is a drawing schematically representing a state of the rawinsonde balloon made to fly by the predetermined gas being injected thereinto while the predetermined parachute is contained inside the rawinsonde balloon in accordance with one example embodiment of the present invention.

FIG. 5A is a drawing schematically representing a state of the rawinsonde balloon 10 made to fly by the predetermined gas being injected thereinto while a predetermined parachute is connected with the rawinsonde balloon in accordance with one example embodiment of the present invention, and FIG. 5B is a drawing schematically representing a state of the rawinsonde balloon made to fly by the predetermined gas being injected thereinto while the predetermined parachute is contained inside the rawinsonde balloon in accordance with one example embodiment of the present invention.

Referring to FIG. 5A, the rawinsonde balloon 10 may be connected to the predetermined parachute 313 outside, but unlike this, as shown in FIG. 5B, the predetermined parachute 313 may be included in the rawinsonde balloon 10. In addition, a reel 312 for winding a rope 311 may be further connected, and such a configuration may vary depending on the working condition.

The present disclosure has an effect of providing a method for determining the locations of the cover fixing members formed on the cover for protecting the rawinsonde balloon, such that the cover may form the balance of force and be stably fixed.

The present disclosure has another effect of providing the cover capable of safely protecting the rawinsonde balloon to a point of time when the rawinsonde balloon is allowed to fly, by changing the mode in response to the change of the rawinsonde balloon accommodated in the inner space.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A cover for protecting a rawinsonde balloon in preparing a flight of the rawinsonde balloon, comprising:
   a cover main body with an inner surface thereof forming inner space therein and an outer surface thereof, wherein the rawinsonde balloon is to be inserted into the inner space of the cover main body;
   an inlet, which is positioned at a preliminary free end of the cover main body, for allowing the rawinsonde balloon to be inserted into the inner space, wherein the preliminary free end of the cover main body becomes a free end of the cover main body at a time when the rawinsonde balloon is allowed to fly;
   an inlet control member, buried at least in part inside the cover main body, for controlling a size of the inlet and fixing a controlled size of the inlet; and
   a first basic cover fixing member to an n-th basic cover fixing member formed respectively at a first basic preliminary fixed end to an n-th basic preliminary fixed end on the outer surface, wherein at least one of the first basic preliminary fixed end to the n-th basic preliminary fixed end becomes a fixed end of the cover main body at the time when the rawinsonde balloon is allowed to fly, and wherein n is an integer of 1 or more;

wherein, on condition that the inlet has been fixed, in response to applying a first partial force vector to a k-th partial force vector respectively to a first specific basic cover fixing member to a k-th specific basic cover fixing member selected among the first basic cover fixing member to the n-th basic cover fixing member, wherein k is an integer equal to or more than 1 and equal to or less than n, a direction of a first total force vector acquired by adding all the first partial force vector to the k-th partial force vector is opposite to a direction of from a virtual origin of the first total force vector to a center of the inlet, wherein, in response to increasing a volume of the rawinsonde balloon in the inner space, the volume of the inner space is dynamically increased within a predetermined range of the volume thereof, and wherein a maximum value of the predetermined range of the volume is determined to be equal to or larger than a qualified volume of the rawinsonde balloon that allows the flight of the rawinsonde balloon, wherein a first additional cover fixing member to a p-th additional cover fixing member are additionally formed respectively at a first additional preliminary fixed end to a p-th additional preliminary fixed end on the outer surface, wherein at least one of the first additional preliminary fixed end to the p-th additional preliminary fixed end becomes the fixed end of the cover main body at the time when the rawinsonde balloon is allowed to fly, and wherein p is an integer of 1 or more;

wherein (i) each of base ends of the first additional cover fixing member to the p-th additional cover fixing member is fixed respectively to the first additional preliminary fixed end to the p-th additional preliminary fixed end, (ii) free ends of the first additional cover fixing member to the p-th additional cover fixing member respectively has a first hook-and-loop fastener member formed thereon, and (iii) on the outer surface, at a first hook-and-loop fastener detachable location to a p-th hook-and-loop fastener detachable location which are respectively distanced from the first additional preliminary fixed end to the p-th additional preliminary fixed end as much as respective lengths of the first additional cover fixing member to the p-th additional cover fixing member, a second hook-and-loop fastener member detachable to the first hook-and-loop fastener member is formed, such that the respective free ends of the first additional cover fixing member to the p-th additional cover fixing member are detachable to the first hook-and-loop fastener detachable location to the p-th hook-and-loop fastener detachable location, and wherein, in response to respectively applying the first partial force vector to the k-th partial force vector to the first specific basic cover fixing member to the k-th specific basic cover fixing member and additionally respectively applying a (k+1)-th partial force vector to a (k+q)-th partial force vector to a first specific additional cover fixing member to a q-th specific additional cover fixing member which are selected among the first additional cover fixing member to the p-th additional cover fixing member, wherein q is an integer of 1 or more and p or less, each of a first specific additional preliminary fixed end to a q-th specific additional preliminary fixed end corresponding to each of the first specific additional cover fixing member to the q-th specific additional cover fixing member is determined such that a second total force vector acquired by adding all of (i) each of the first partial force vector to the k-th partial force vector and (ii) each of the (k+1)-th partial force vector to the (k+q)-th partial force vector is opposite to a direction of from a virtual origin of the second total force vector to the center of the inlet.

2. The cover of claim 1, wherein the outer surface includes: a first outer surface region which is a region closer to the inlet among two divided regions and a second outer surface region which is another region far away from the inlet among the two divided regions, wherein the two divided regions are acquired by dividing the outer surface on a basis of a virtual plane whose normal vector is parallel to the first total force vector, the virtual plane dividing the inner space in a predetermined ratio, and wherein each of the first basic preliminary fixed end to the n-th basic preliminary fixed end are located on the second outer surface region.

3. The cover of claim 1, wherein the cover allows the flight of the rawinsonde balloon by changing its mode in the order of: (i) a first mode in which the rawinsonde balloon without gas therein is accommodated in the inner space and at least part of a gas injection unit for injecting the gas into the rawinsonde balloon is exposed through the inlet, (ii) a second mode in which at least part of a gas injection device for spraying the gas is inserted into the gas injection unit and sprays the gas into the rawinsonde balloon, to thereby inflate the rawinsonde balloon, and at the same time the volume of the inner space is inflated to be corresponding to the inflation of the rawinsonde balloon, and (iii) a third mode in which the rawinsonde balloon is inflated up to the qualified volume or more and the inlet expands such that the rawinsonde balloon is allowed to pass therethrough.

4. The cover of claim 3, wherein, in each of the first mode, the second mode and the third mode, a size of the inlet is adjusted and fixed by the inlet control member such that the gas injection unit and the inlet are tightly in contact with each other, and wherein, in the third mode, in response to releasing the inlet control member, (i) the preliminary free end is allowed to face toward sky as a free end by buoyancy generated due to the rawinsonde balloon and (ii) the inlet expands to an extent that the rawinsonde balloon is allowed to pass therethrough by the buoyancy.

5. The cover of claim 4, wherein a rope for connecting a predetermined observation device and the rawinsonde balloon is engaged with the gas injection unit or a predetermined parachute which is connected with the rawinsonde balloon, before the inlet control member is released on condition that the cover has changed to the third mode.

6. A cover for protecting a rawinsonde balloon in preparing a flight of the rawinsonde balloon, comprising:

a cover main body with an inner surface thereof forming inner space therein and an outer surface thereof, wherein the rawinsonde balloon is to be inserted into the inner space of the cover main body;

an inlet, which is positioned at a preliminary free end of the cover main body, for allowing the rawinsonde balloon to be inserted into the inner space, wherein the preliminary free end of the cover main body becomes a free end of the cover main body at a time when the rawinsonde balloon is allowed to fly;

an inlet control member, buried at least in part inside the cover main body, for controlling a size of the inlet and fixing a controlled size of the inlet; and a first basic cover fixing member to an n-th basic cover fixing member formed respectively at a first basic preliminary fixed end to an n-th basic preliminary fixed end on the outer surface, wherein at least one of the first basic preliminary fixed end to the n-th basic preliminary fixed end becomes a fixed end of the cover main body at the time when the rawinsonde balloon is allowed to fly, and wherein n is an integer of 1 or more;

wherein, on condition that the inlet has been fixed, in response to applying a first partial force vector to a k-th partial force vector respectively to a first specific basic cover fixing member to a k-th specific basic cover fixing member selected among the first basic cover fixing member to the n-th basic cover fixing member, wherein k is an integer equal to or more than 1 and equal to or less than n, a direction of a first total force vector acquired by adding all the first partial force vector to the k-th partial force vector is opposite to a direction of from a virtual origin of the first total force vector to a center of the inlet, wherein, in response to increasing a volume of the rawinsonde balloon in the inner space, the volume of the inner space is dynamically increased within a predetermined range of the volume thereof, and wherein a maximum value of the predetermined range of the volume is determined to be equal to or larger than a qualified volume of the rawinsonde balloon that allows the flight of the rawinsonde balloon, wherein at least one of the first basic cover fixing member to the n-th basic cover fixing member is a predetermined hook-and-loop fastener-inclusive cover fixing member, wherein the hook-and-loop fastener-inclusive cover fixing member has (i) a base end fixed by engaging it with a specific basic preliminary fixed end, corresponding to the hook-and-loop fastener-inclusive cover fixing member, among the first basic preliminary fixed end to the n-th basic preliminary fixed end, (ii) a free end on which a first hook-and-loop fastener member is formed, and wherein (iii) on the outer surface, at a hook-and-loop fastener detachable location distanced from the base end of the hook-and-loop fastener-inclusive cover fixing member as much as a length of the hook-and-loop fastener inclusive cover fixing member along the outer surface, a second hook-and-loop fastener member detachable to the first hook-and-loop fastener member is formed, such that the free end of the hook-and-loop fastener inclusive cover fixing member is detachable.

7. The cover of claim 1, wherein the outer surface is made of waterproof material, and wherein the inner surface is (i) made of a predetermined material that reduces friction to be generated between the rawinsonde balloon and the inner surface and (ii) coated with a substance in a form of powder having properties that do not agglomerate by moisture, wherein the substance in the form of powder that does not agglomerate with moisture includes talcum powder, in order to alleviate the friction within a predetermined value.

8. The cover of claim 1, wherein the first basic cover fixing member to the n-th basic cover fixing member are respectively formed on fixed locations on the outer surface.

9. A cover for protecting a rawinsonde balloon in preparing a flight of the rawinsonde balloon, comprising:

a cover main body with an inner surface thereof forming inner space therein and an outer surface thereof, wherein the rawinsonde balloon is to be inserted into the inner space of the cover main body;

an inlet, which is positioned at a preliminary free end of the cover main body, for allowing the rawinsonde balloon to be inserted into the inner space, wherein the preliminary free end of the cover main body becomes a free end of the cover main body at a time when the rawinsonde balloon is allowed to fly;

an inlet control member, buried at least in part inside the cover main body, for controlling a size of the inlet and fixing a controlled size of the inlet; and a first basic cover fixing member to an n-th basic cover fixing member located respectively at a first basic preliminary fixed end to an n-th basic preliminary fixed end on the outer surface, wherein at least one of the first basic preliminary fixed end to the n-th basic preliminary fixed end becomes a fixed end of the cover main body at the time when the rawinsonde balloon is allowed to fly, and wherein n is an integer of 1 or more;

wherein, on condition that the inlet has been fixed, in response to applying a first partial force vector to a k-th partial force vector respectively to a first specific basic cover fixing member to a k-th specific basic cover fixing member selected among the first basic cover fixing member to the n-th basic cover fixing member, wherein k is an integer equal to or more than 1 and equal to or less than n, a direction of a first total force vector acquired by adding all the first partial force vector to the k-th partial force vector is opposite to a direction of from a virtual origin of the first total force vector to a center of the inlet, wherein, in response to increasing a volume of the rawinsonde balloon in the inner space, the volume of the inner space is dynamically increased within a predetermined range of the volume thereof, and wherein a maximum value of the predetermined range of the volume is determined to be equal to or larger than a qualified volume of the rawinsonde balloon that allows the flight of the rawinsonde balloon, wherein the outer surface has a first guiding member to a j-th guiding member formed thereon, wherein said j is an integer of 1 or more and n or less, wherein the first basic cover fixing member to the n-th basic cover fixing member are respectively classified into a first cluster to a j-th cluster such that at least one does not overlap with another, and wherein the first basic cover fixing member to the n-th basic cover fixing member are movably coupled with the first guiding member to the j-th guiding member respectively corresponding to the first cluster to the j-th cluster, and wherein, (i) in response to applying the first partial force vector to the k-th partial force vector respectively to the first specific basic cover fixing member to the k-th specific basic cover fixing member, the first specific basic cover fixing member to the k-th specific basic cover fixing member are slidably moved along their corresponding specific guiding members among the first guiding member to the j-th guiding member, and then (ii) in response to determining that the first specific basic cover fixing member to the k-th specific basic cover fixing member are respectively arrived at a first location to a k-th location where the first specific basic cover fixing member to the k-th specific basic cover fixing member are no longer slidably moved the first location to the k-th location are respectively determined as the first specific basic preliminary fixed end to a k-th specific basic preliminary fixed end.

* * * * *